US012275246B2

(12) United States Patent
Tsuji et al.

(10) Patent No.: US 12,275,246 B2
(45) Date of Patent: Apr. 15, 2025

(54) LIQUID EJECTION HEAD AND LIQUID EJECTION APPARATUS

(71) Applicant: CANON KABUSHIKI KAISHA, Tokyo (JP)

(72) Inventors: Tomoki Tsuji, Kanagawa (JP); Hiromasa Amma, Kanagawa (JP); Shingo Okushima, Kanagawa (JP); Takuya Iwano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 18/128,016

(22) Filed: Mar. 29, 2023

(65) Prior Publication Data

US 2023/0311510 A1 Oct. 5, 2023

(30) Foreign Application Priority Data

Mar. 30, 2022 (JP) ................................ 2022-056229

(51) Int. Cl.
*B41J 2/16* (2006.01)
*B41J 2/14* (2006.01)

(52) U.S. Cl.
CPC ............... *B41J 2/1623* (2013.01); *B41J 2/14* (2013.01); *B41J 2002/14362* (2013.01); *B41J 2002/14491* (2013.01); *B41J 2202/19* (2013.01)

(58) Field of Classification Search
CPC .. B41J 2/1623; B41J 2/14; B41J 2002/14362; B41J 2002/14491; B41J 2202/19
See application file for complete search history.

(56) References Cited

U.S. PATENT DOCUMENTS 9,248,650 B2 * 2/2016 Muraoka ................ B41J 2/1433
9,855,751 B2 1/2018 Sakai et al.

FOREIGN PATENT DOCUMENTS

JP 2015-039795 A 3/2015

* cited by examiner

*Primary Examiner* — Lisa Solomon
(74) *Attorney, Agent, or Firm* — Venable LLP

(57) ABSTRACT

A liquid ejection head and a liquid ejection apparatus are designed to suppress separation of ejection modules from a support member. To this end, a liquid supply unit is aligned with respect to the support member to which the ejection modules are bonded. Moreover, in a connection unit of an ejection unit and the liquid supply unit, liquid connection units of the ejection unit are connected to be movable relative to the liquid supply unit.

9 Claims, 13 Drawing Sheets

LIQUID EJECTION HEAD AND LIQUID EJECTION APPARATUS

BACKGROUND OF THE INVENTION

Field of the Invention

The present invention relates to a liquid ejection head and a liquid ejection apparatus.

Description of the Related Art

Japanese Patent Laid-Open No. 2015-39795 discloses a liquid ejection head with a configuration in which a liquid flow passage is provided in a support member. However, in the case where a liquid reaches high temperature in usage such as in the case of, for example, an UV ink, there is a risk that heat transmission from the liquid to the support member causes the support member to be affected by linear expansion, and reduces liquid ejection accuracy. Accordingly, there is known a liquid ejection head with a configuration in which an ejection unit is attached to a support member provided with no liquid flow passage.

FIG. 1 is a view schematically illustrating a general liquid ejection head 13 with a configuration in which an ejection unit 17 is attached to a support member 11 provided with no support member. The support member 11 is provided with through-holes and ejection modules 12 are attached in such a form that the ejection modules 12 are inserted in the through-holes of the support member 11. The ejection modules 12 are bonded and fixed to bonding surfaces 14 that are surfaces of the support member 11 on the ejection direction (Z direction) side. The ejection unit 17 is connected to a liquid supply unit 15 in a connection unit 16, and a liquid is supplied from the liquid supply unit 15 to the ejection unit 17.

In the connection of the ejection unit 17 and the liquid supply unit 15, force in the Z direction is applied to the ejection unit 17. In the case where the force in the Z direction is applied to the ejection unit 17, force in a direction in which the ejection modules 12 are separated from the support member 11 is applied to bonding portions of the ejection modules 12 and the support member 11. Accordingly, there is a risk that the ejection modules 12 are separated from the support member 11.

Moreover, in the case where the temperature of the liquid ejection head 13 becomes high in usage, the ejection unit 17 expands due to an effect of linear expansion, and force acts in a direction in which the ejection modules 12 are separated from the support member 11. Accordingly, there is a risk of separation of the ejection modules 12 from the support member 11.

SUMMARY OF THE INVENTION

The present invention thus provides a liquid ejection head and a liquid ejection apparatus in which separation of an ejection module from a support member is suppressed.

A liquid ejection head of the present invention is a liquid ejection head including: an ejection module configured to eject a liquid in an ejection direction; a support member configured to support the ejection module; and a liquid supply unit connected to the ejection module by a connection flow passage and configured to supply the liquid to the ejection module, in which the support member supports the ejection module such that the ejection module is bonded to a surface of the support member on the ejection direction side, the liquid supply unit is aligned with respect to the support member, the connection flow passage is provided to be movable relative to the liquid supply unit in a state where the ejection module and the liquid supply unit are connected to each other by the connection flow passage.

The present invention can provide a liquid ejection head and a liquid ejection apparatus in which separation of an ejection module from a support member is suppressed.

Further features of the present invention will become apparent from the following description of exemplary embodiments with reference to the attached drawings.

DESCRIPTION OF THE EMBODIMENTS

First Embodiment

A first embodiment of the present invention is described below with reference to the drawings.

Figure 1:
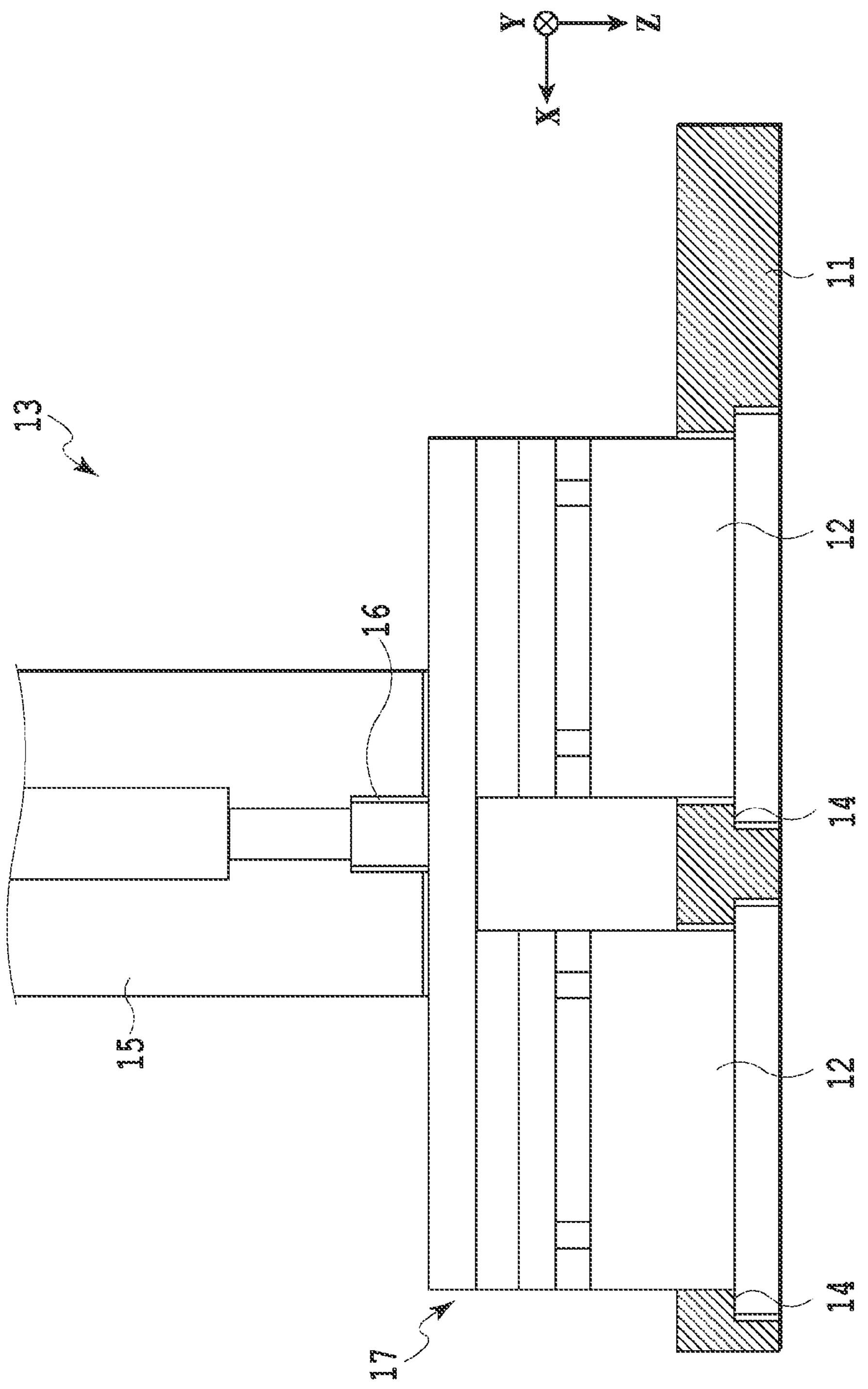
FIG. 1 is a view schematically illustrating a general liquid ejection head.
Figure 2:
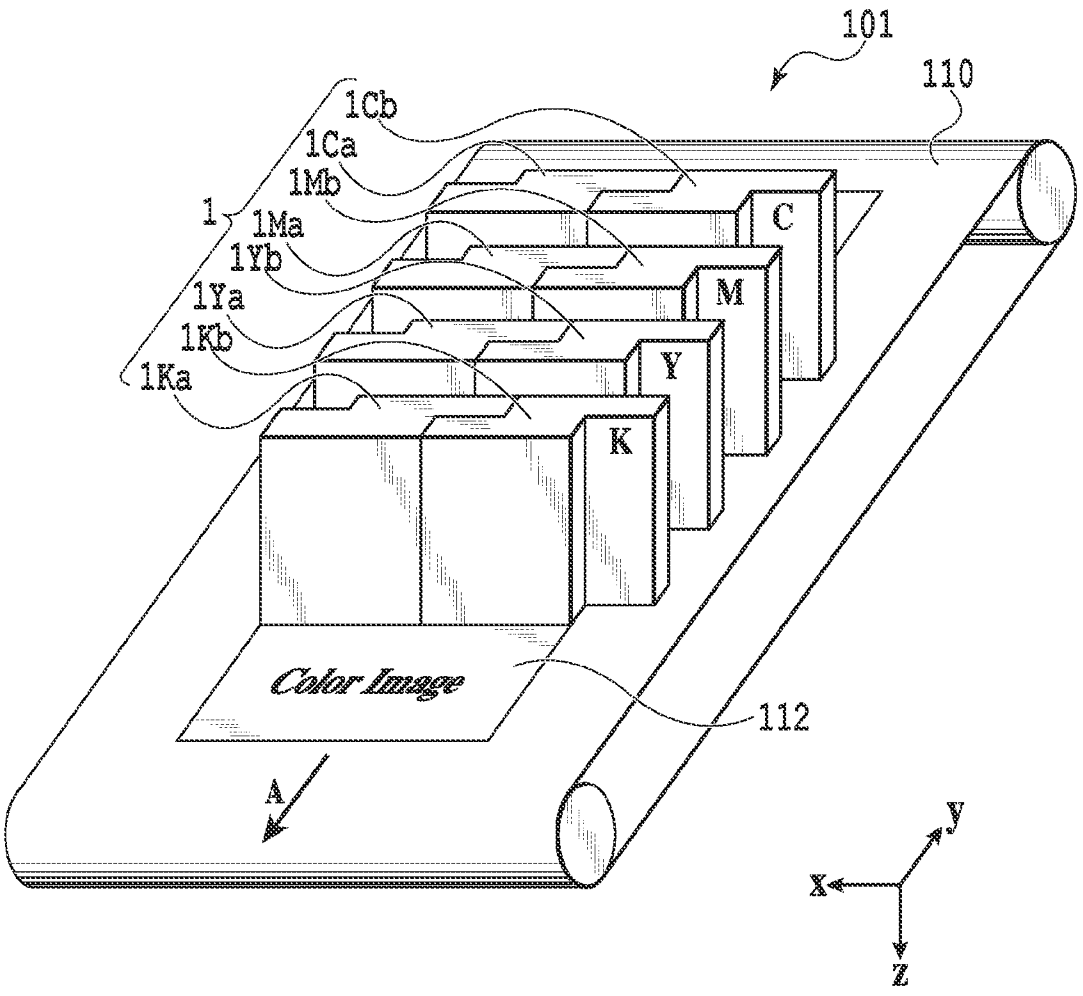
FIG. 2 is a schematic perspective view illustrating a liquid ejection apparatus.

FIG. 2 is a schematic perspective view illustrating a liquid ejection apparatus 101 configured such that a liquid ejection head module 1 is mountable, the liquid ejection head module 1 being a module to which the present embodiment can be applied. The liquid ejection apparatus 101 forms an image on a print medium 112 by ejecting liquids (hereinafter, also referred to as inks) from the liquid ejection head module 1 while moving the print medium 112 at a position where the print medium 112 faces a liquid ejection surface of the liquid ejection head module 1. The liquid ejection head module 1 mounted in the liquid ejection apparatus 101 includes liquid ejection heads 1Ca and 1Cb corresponding to a cyan (C) ink and liquid ejection heads 1Ma and 1Mb corresponding to a magenta (M) ink. The liquid ejection head module 1 also includes liquid ejection heads 1Ya and 1Yb corresponding to a yellow ink and liquid ejection heads 1Ka and 1Kb corresponding to a black (K) ink.

The liquid ejection head module 1 is provided with multiple ejection ports arranged in an X direction corresponding to the width of the print medium 112. A conveyance unit 110 conveys the print medium 112 in an A direction, and the liquid ejection head module 1 performs printing on the print medium 112. Since the liquid ejection heads 1Ca, 1Cb, 1Ma, 1Mb, 1Ya, 1Yb, 1Ka, and 1Kb all have the same configuration, they are each described below as a liquid ejection head 3 without being described separately for each color.

Figure 3B:
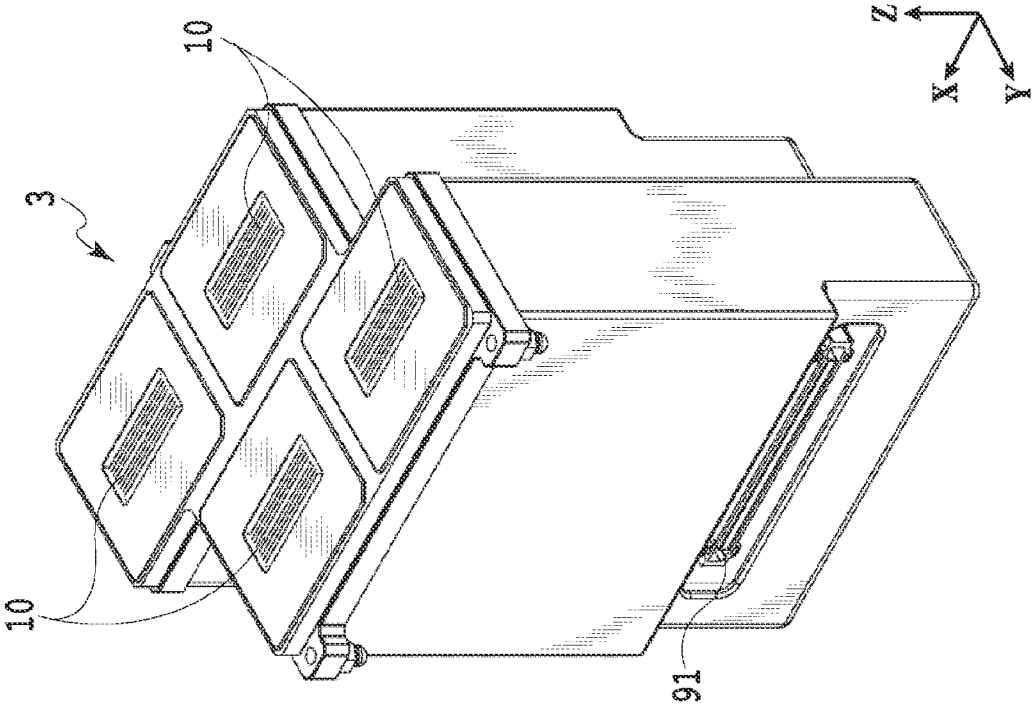
FIG. 3B is an exterior perspective view illustrating the liquid ejection head.
Figure 3A:
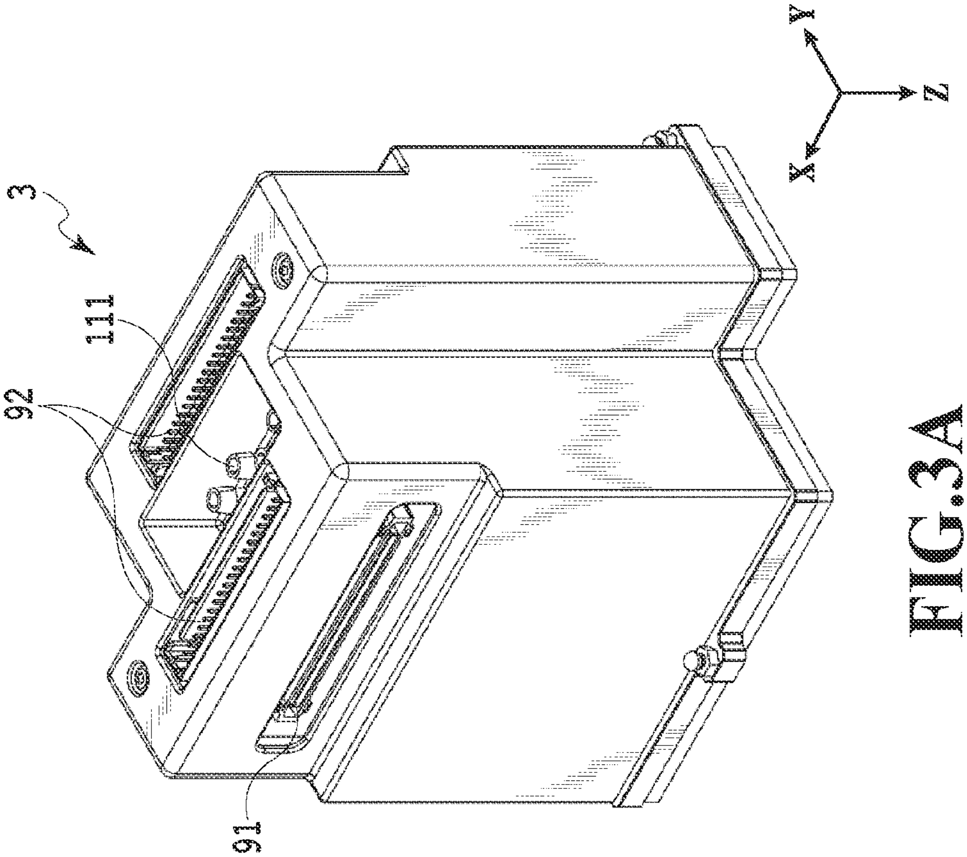
FIG. 3A is an exterior perspective view illustrating a liquid ejection head.

FIGS. 3A and 3B are exterior perspective views illustrating the liquid ejection head 3 to which the present embodiment can be applied. FIG. 3A is a view illustrating the liquid ejection head 3 such that a liquid connection unit 111 can be viewed, and FIG. 3B is a view illustrating the liquid ejection head 3 turned about an X axis from the state of FIG. 3A such that print element boards 10 can be viewed. The liquid ejection head 3 includes four print element boards 10 that can eject the liquid and that are arranged in zigzag and signal input terminals 91 and power supply terminals 92 that are electrically connected to the print element boards 10 via flexible wiring boards and electrical wiring boards to be described later.

The signal input terminals 91 and the power supply terminals 92 are electrically connected to a control unit of the liquid ejection apparatus 101, and supply ejection drive signals and power necessary for ejection, to the print element boards 10. Integrating wires with electric circuits in the electric wiring boards can make the number of signal input terminals 91 and the number of power supply terminals 92 smaller than the number of print element boards 10. This can reduce the number of electrical connection units that require removal in attachment of the liquid ejection head 3 to the liquid ejection apparatus 101 or replacement of the liquid ejection head 3. The liquid ejection head 3 ejects the liquid by using action of ejection energy generated by print elements included in the print element boards 10.

The liquid connection unit 111 is connected to a liquid supply system of the liquid ejection apparatus 101. The ink is thereby supplied from the supply system of the liquid ejection apparatus 101 to the liquid ejection head 3, and the ink having passed the inside of the liquid ejection head 3 is collected into a collection system of the liquid ejection apparatus 101. The liquid ejection apparatus 101 is configured such that the ink of each color can circulate through a path of the liquid ejection apparatus 101 and a path of the liquid ejection head 3 as described above.

Figure 4:
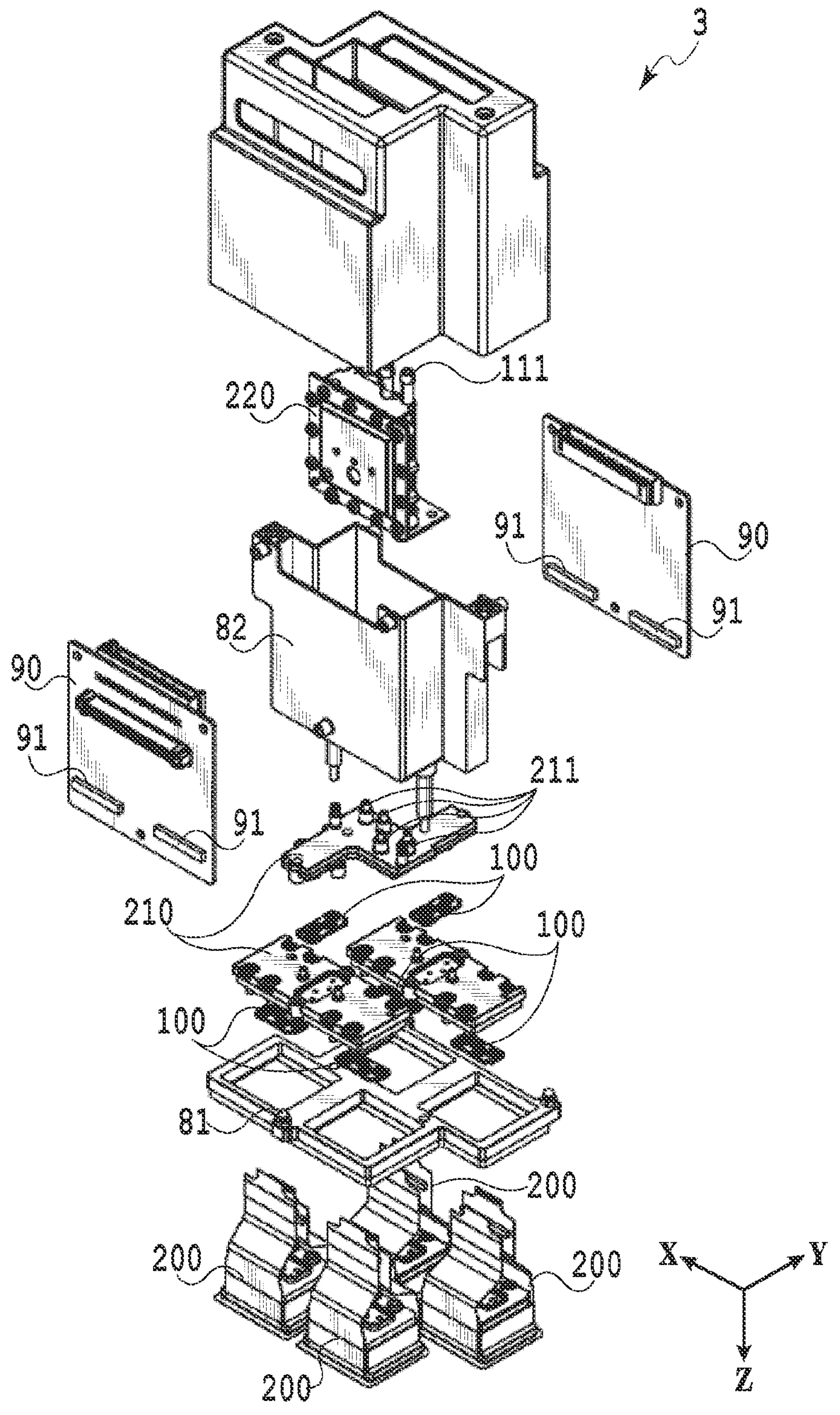
FIG. 4 is an exploded perspective view illustrating the liquid ejection head.

FIG. 4 is an exploded perspective view illustrating the liquid ejection head 3. Ejection modules 200 are attached to an electric wiring board support member 82, and the electric wiring board support member 82 is attached to a support member 81. A liquid supply unit 220 is provided with the liquid connection unit 111, and a not-illustrated filter communicating with each of openings of the liquid connection unit 111 is provided inside the liquid supply unit 220 to remove foreign objects in the supplied ink. The electric wiring board support member 82 supports an electric wiring board 90. The liquids supplied from the liquid supply unit 220 are supplied to the ejection modules 200 via liquid connection units 211 of a flow passage member 210.

Figure 5B:
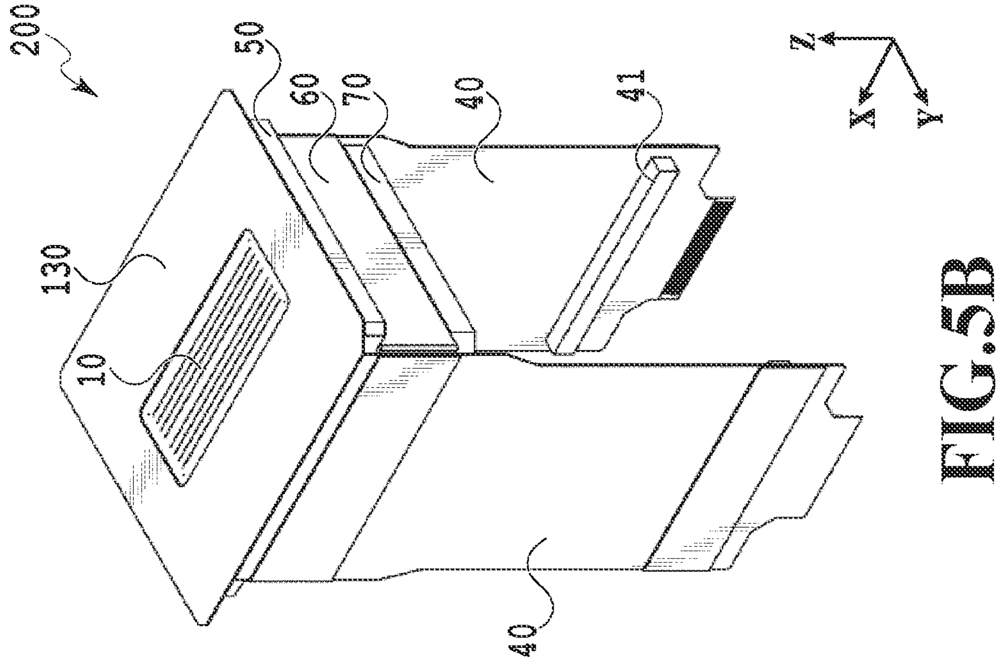
FIG. 5B is an exterior view illustrating the ejection module.
Figure 5A:
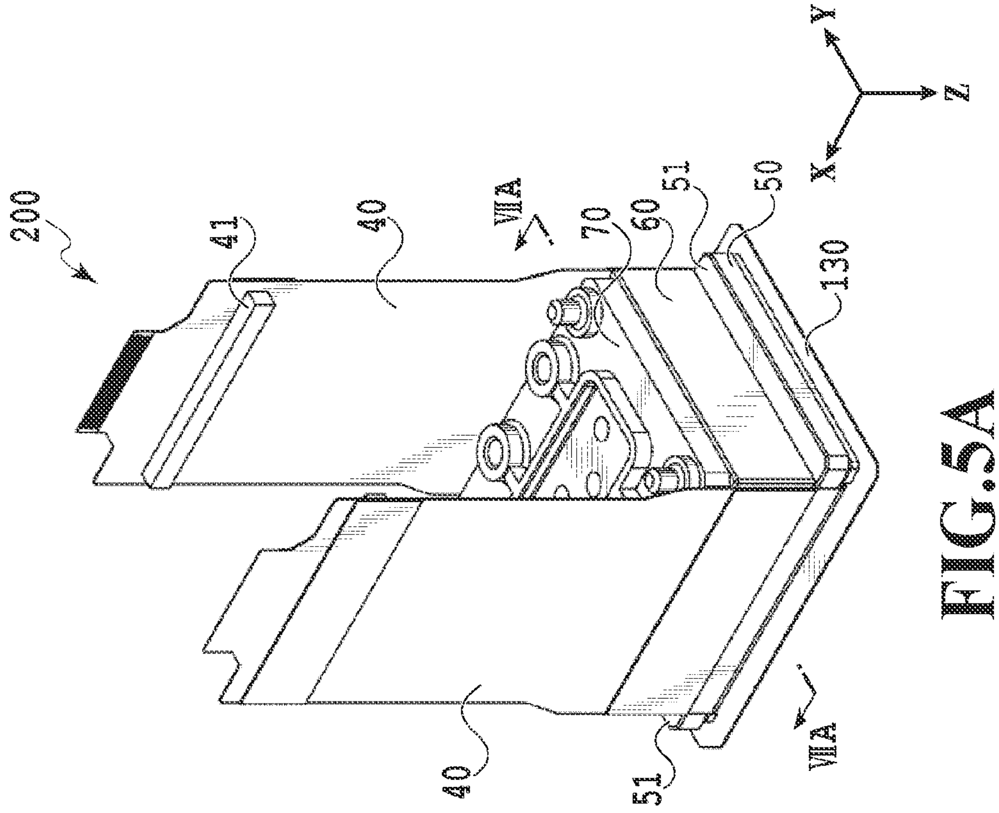
FIG. 5A is an exterior view illustrating an ejection module.
Figure 6:
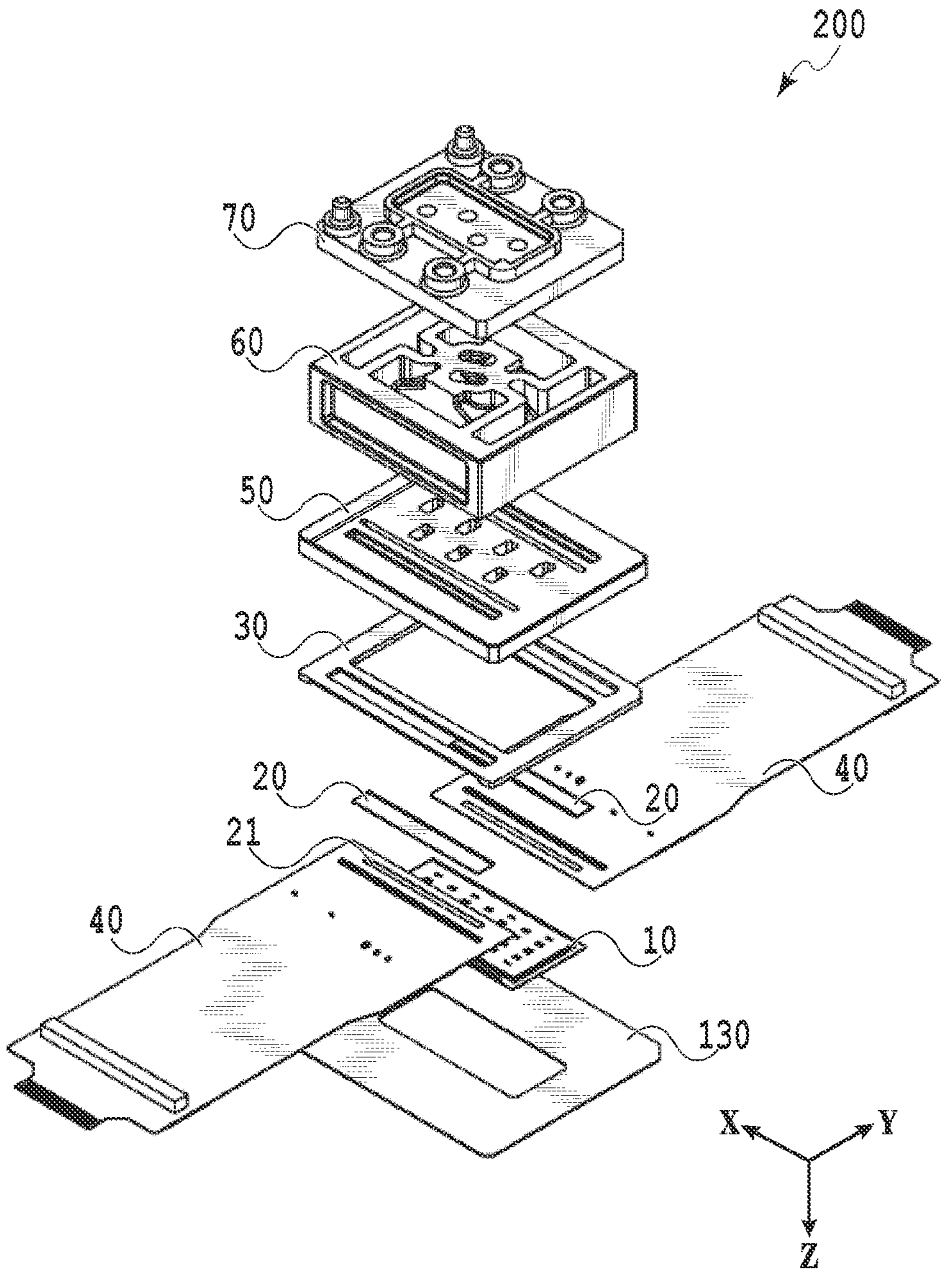
FIG. 6 is an exploded perspective view of the ejection module.
Figure 7A:
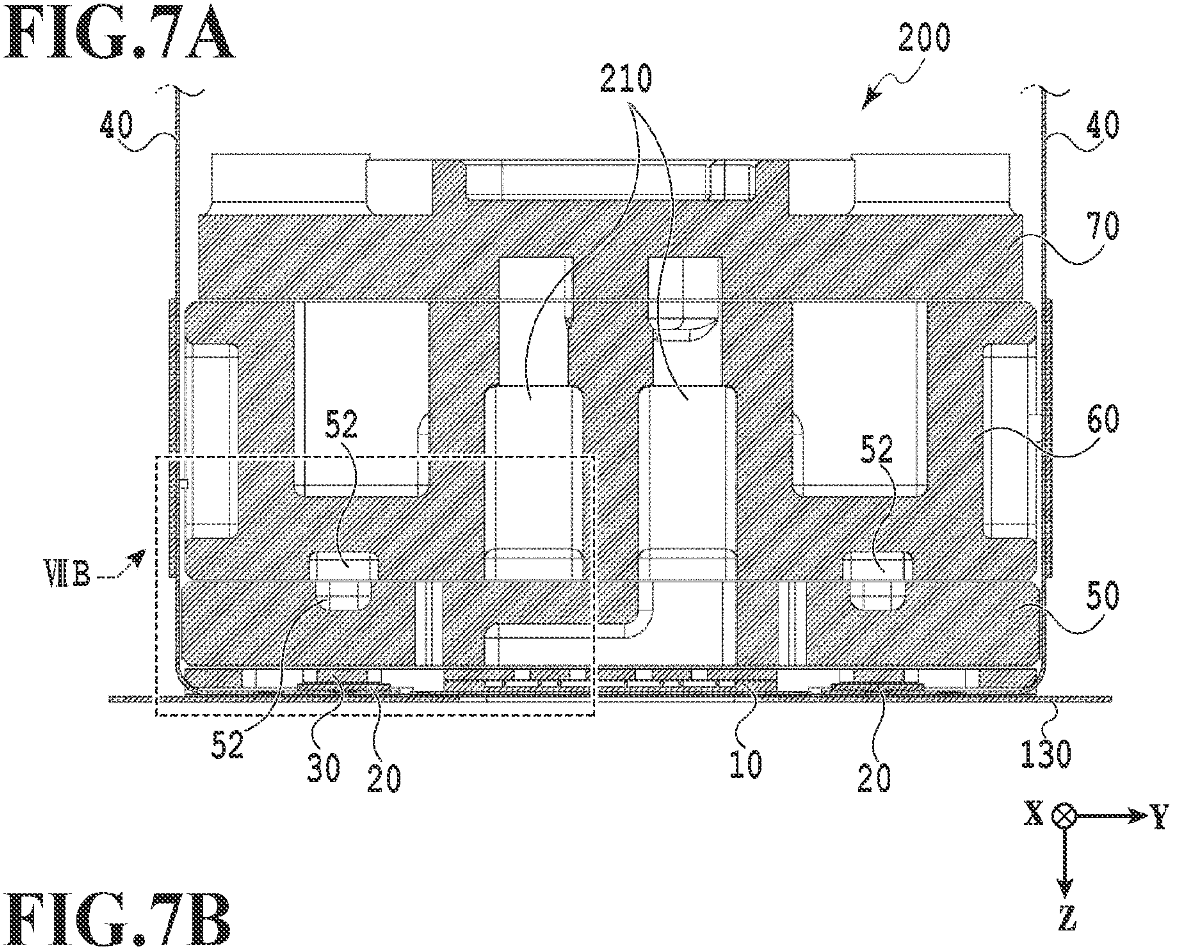
FIG. 7A is a view illustrating the ejection module.
Figure 7B:
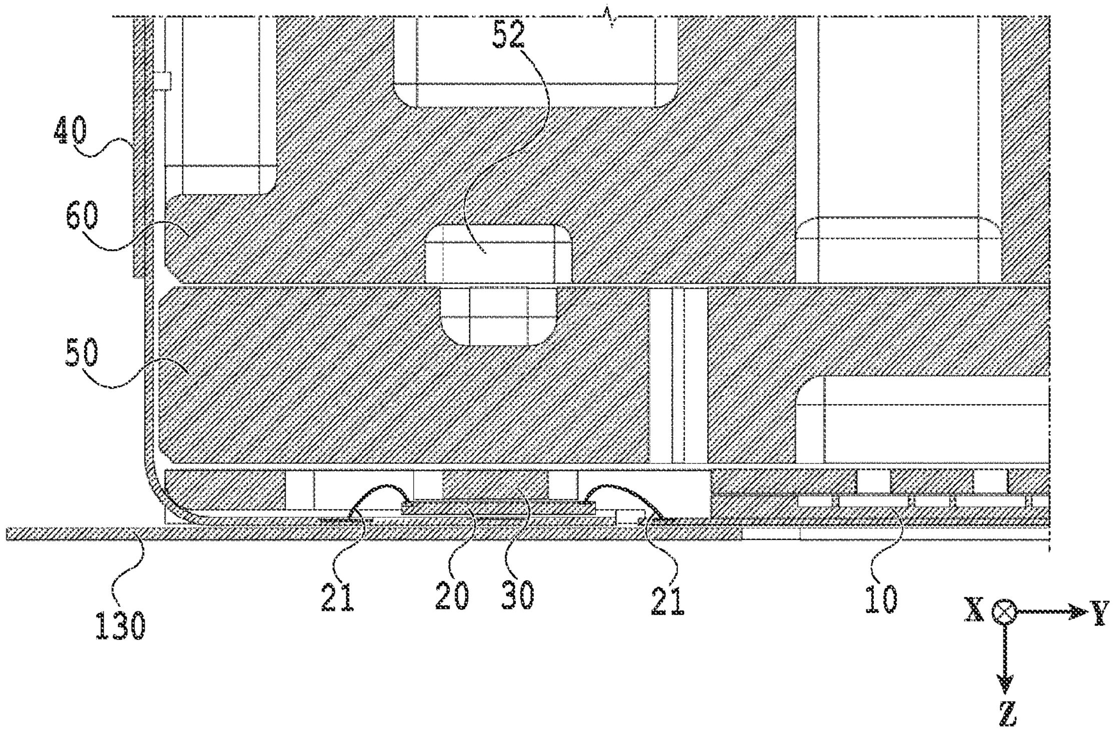
FIG. 7B is a view illustrating the ejection module.

FIGS. 5A and 5B are exterior views illustrating each of the ejection modules 200. FIG. 5A is a view from the third flow passage member 70 side and FIG. 5B is a view from the print element board 10 side. Moreover, FIG. 6 is an exploded perspective view of the ejection module 200. Furthermore, FIG. 7A is a cross-sectional view of the ejection module 200, and FIG. 7B is a view illustrating a portion VIIB of FIG. 7A in an enlarged manner.

In manufacturing of the ejection module 200, first, the print element board 10 and flexible wiring boards 40 are joined onto a print element board support member 130. Electrodes 21 for installing drive circuit boards 20 are provided on the flexible wiring boards 40, and the drive circuit boards 20 are fixed by using electrically-conductive adhesive. The print element board 10 and the drive circuit boards 20 as well as the drive circuit boards 20 and the flexible wiring boards 40 are electrically connected to one another by wire bonding. The drive circuit boards 20 are connected to coolant flow passages 52 via a cooling member 30 to suppress a temperature increase caused by heat generated in operations. In the ejection module 200, liquid flow passages are formed by a first flow passage member 50, a second flow passage member 60, and the third flow passage member 70. The first flow passage member 50 is preferably a member with high thermal conductivity such as, for example, alumina to facilitate transmission of temperature of a coolant flowing in the coolant flow passages 52 to the cooling member 30.

One ejection module 200 includes four flow passages. Two liquid flow passages 210 among the four flow passages communicate with the print element board 10, and are flow passages for the liquid to be ejected. The other two flow passages are the coolant flow passages 52 through which the coolant flows, and are flow passages for reducing the temperature of the drive circuit boards 20.

Figure 8A:
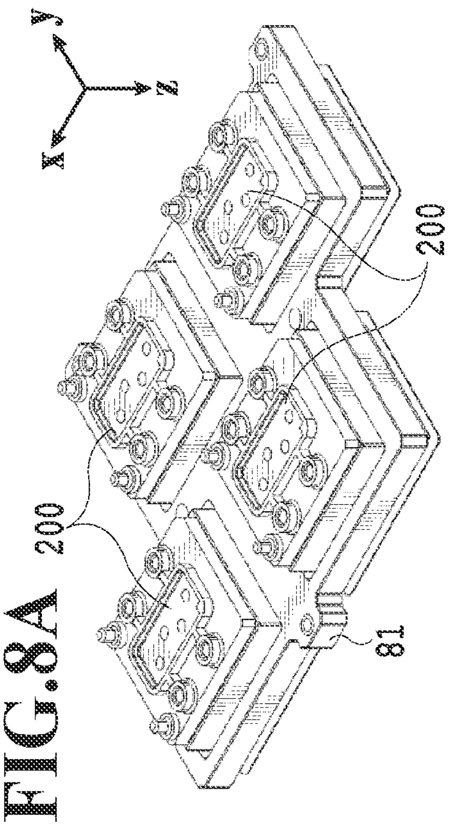
FIG. 8A is a view illustrating a support member and the ejection modules.
Figure 8B:
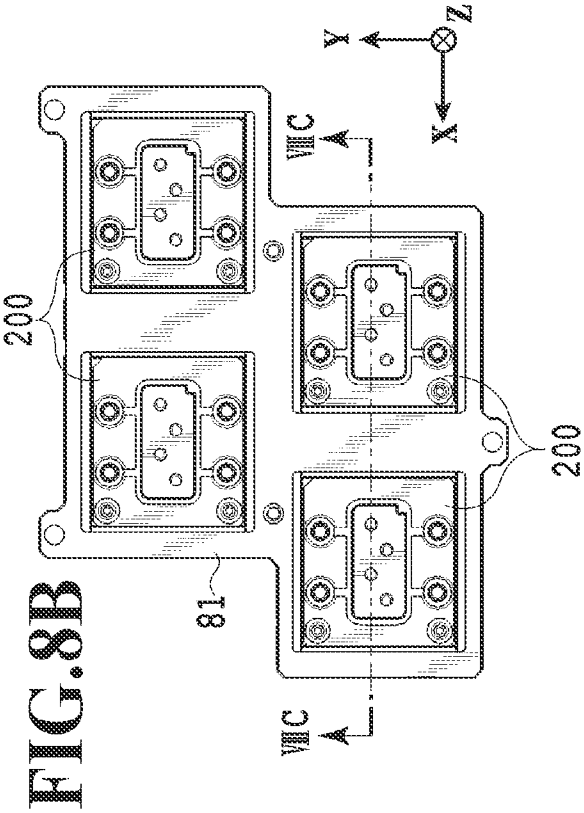
FIG. 8B is a view illustrating the support member and the ejection modules.
Figure 8C:
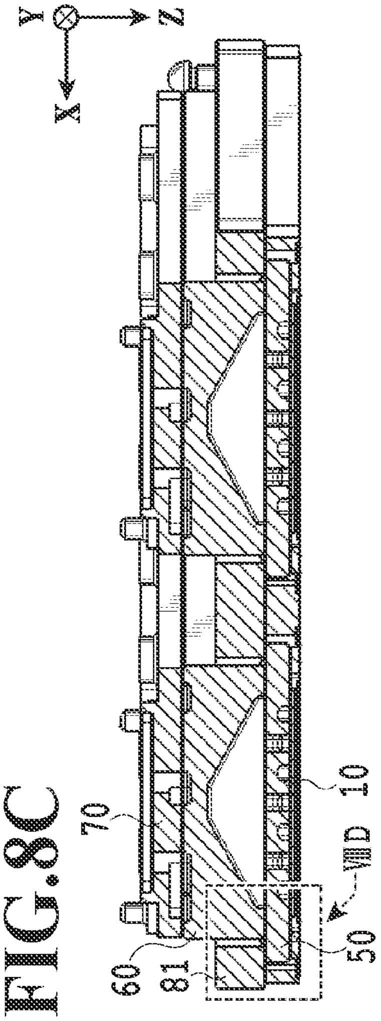
FIG. 8C is a view illustrating the support member and the ejection modules.
Figure 8D:
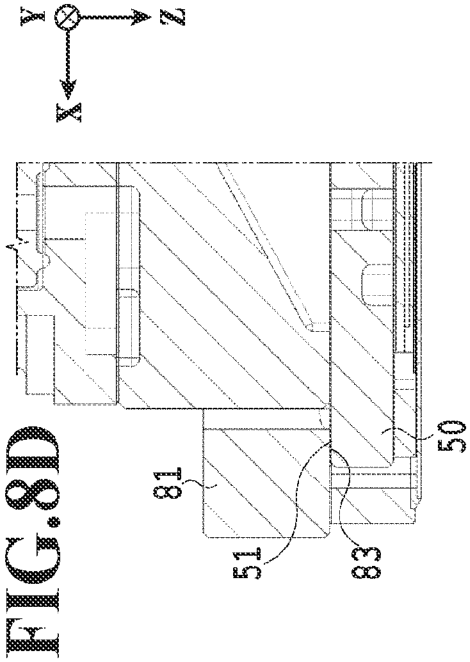
FIG. 8D is a view illustrating the support member and the ejection modules.

FIGS. 8A to 8D are views illustrating the support member 81 and the ejection modules 200. FIG. 8A is an exterior perspective view, FIG. 8B is a top view, FIG. 8C is a cross-sectional view along the line VIIIC-VIIIC in FIG. 8B, and FIG. 8D is a view illustrating a portion VIIID in FIG. 8C in an enlarged manner. Note that illustration of the flexible wiring boards 40 is omitted in FIGS. 8A to 8D to facilitate viewing. Moreover, although a configuration in which four ejection modules 200 are mounted in the support member 81 is described as an example in the present embodiment, the configuration is not limited to this. A configuration in which one or two or more ejection modules 200 are mounted may be employed. The first flow passage member 50 in each ejection module 200 is bonded to a surface of the support member 81 on the Z direction side, the Z direction being a direction in which the liquid is ejected.

Note that, as illustrated in FIG. 5A, side surfaces of the first flow passage member 50 in the X direction are covered with the flexible wiring boards 40. Accordingly, each ejection module 200 is bonded to the support member 81 on bonding surfaces 51 of the first flow passage member 50 that protrude out from both ends of the flexible wiring boards 40. This configuration allows the support member 81 and the liquid flow passages in the ejection module 200 to be separated from one another, and can suppress heat transmission to the support member 81 in usage of high-temperature liquids and suppress misalignment of the liquid ejection head 3 due to heat.

Figure 9A:
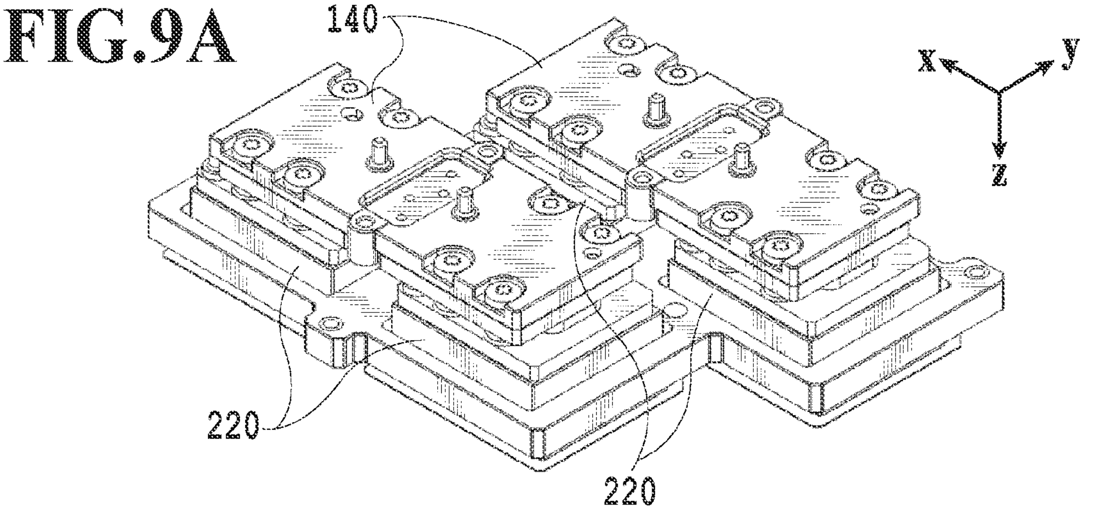
FIG. 9A is a view illustrating a state where first flow passage units are attached in the state of FIG. 8A.
Figure 9B:
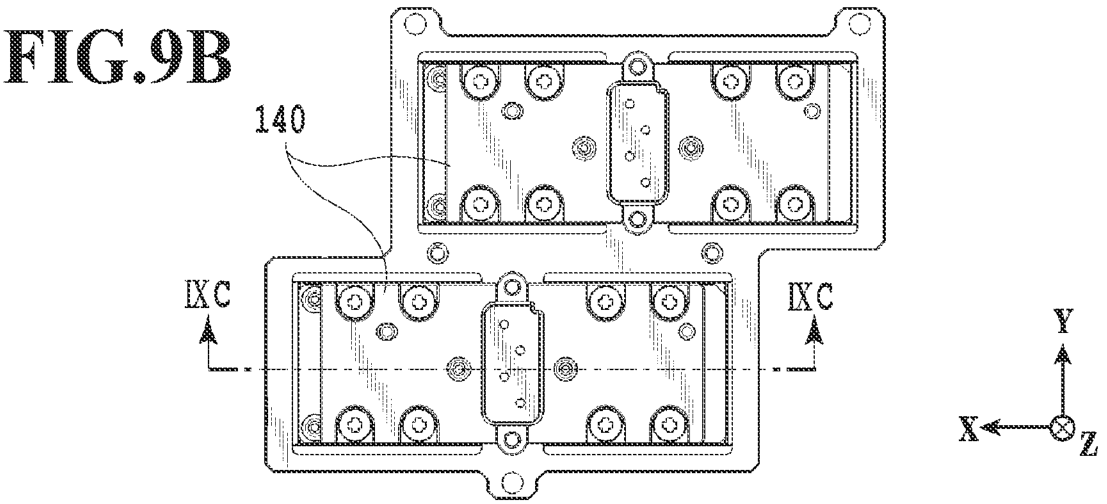
FIG. 9B is a view illustrating a state where the first flow passage units are attached in the state of FIG. 8A.
Figure 9C:
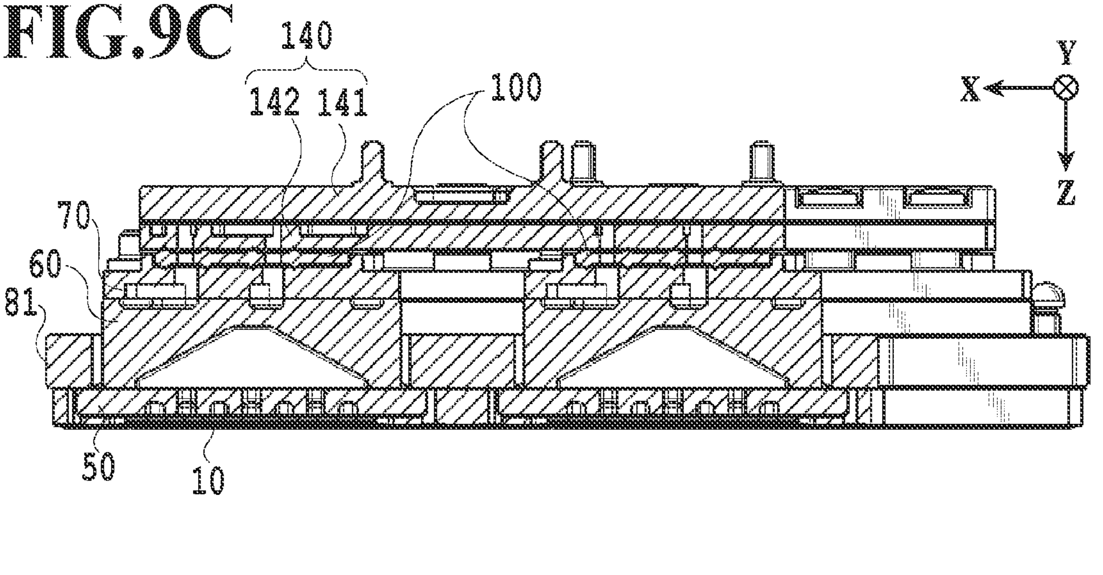
FIG. 9C is a view illustrating a state where the first flow passage units are attached in the state of FIG. 8A.

FIGS. 9A to 9C are views illustrating a state where first flow passage units 140 are attached in the state of FIG. 8A FIG. 9A is an exterior perspective view, FIG. 9B is a top view, and FIG. 9C is a cross-sectional view along the line IXC-IXC in FIG. 9B. The ejection modules 200 are connected to the liquid supply unit 220 via connection flow passages. The first flow passage units 140 that are part of the connection flow passages are each formed by joining a fourth flow passage member 141 and a fifth flow passage member 142 (see FIG. 9C) to each other by adhesive. Moreover, each first flow passage unit 140 includes joint rubbers 100 (see FIG. 9C) that are elastic members, between itself and two ejection modules 200 arranged in parallel in the X direction. Compressing the first flow passage unit 140 in the Z direction by screw fastening achieves flow passage connection between the ejection modules 200 and the first flow passage unit 140.

Figure 10A:
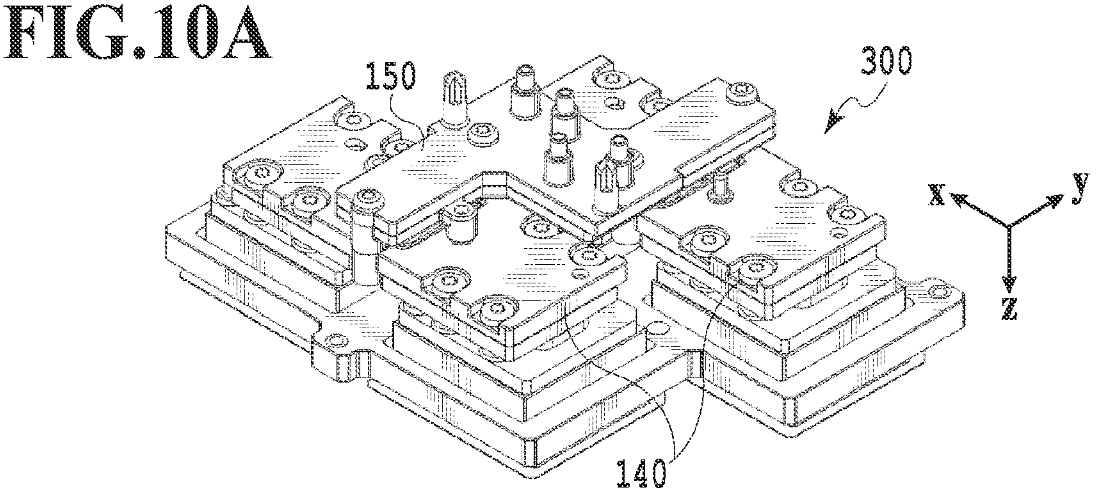
FIG. 10A is a view illustrating a state where a second flow passage unit is attached in the state of FIG. 9A.
Figure 10B:
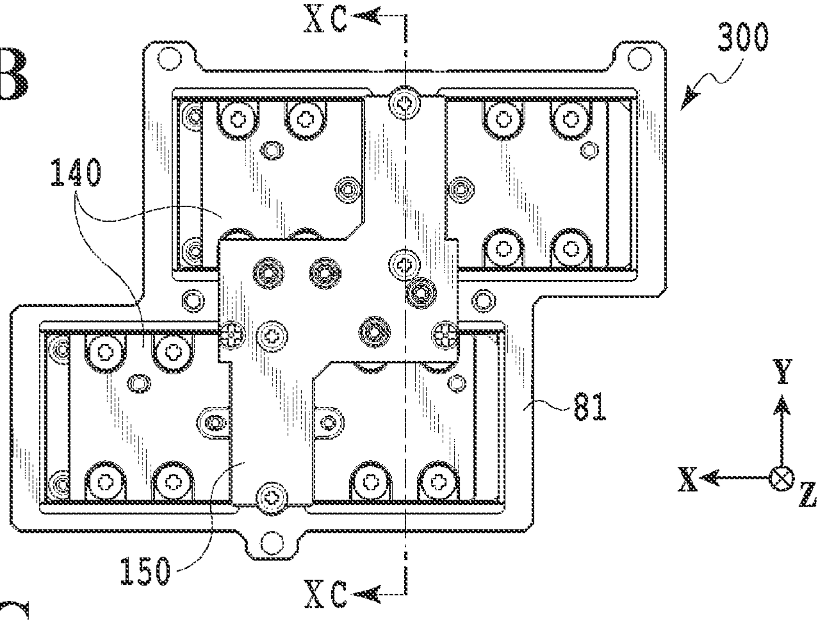
FIG. 10B is a view illustrating a state where the second flow passage unit is attached in the state of FIG. 9A.
Figure 10C:
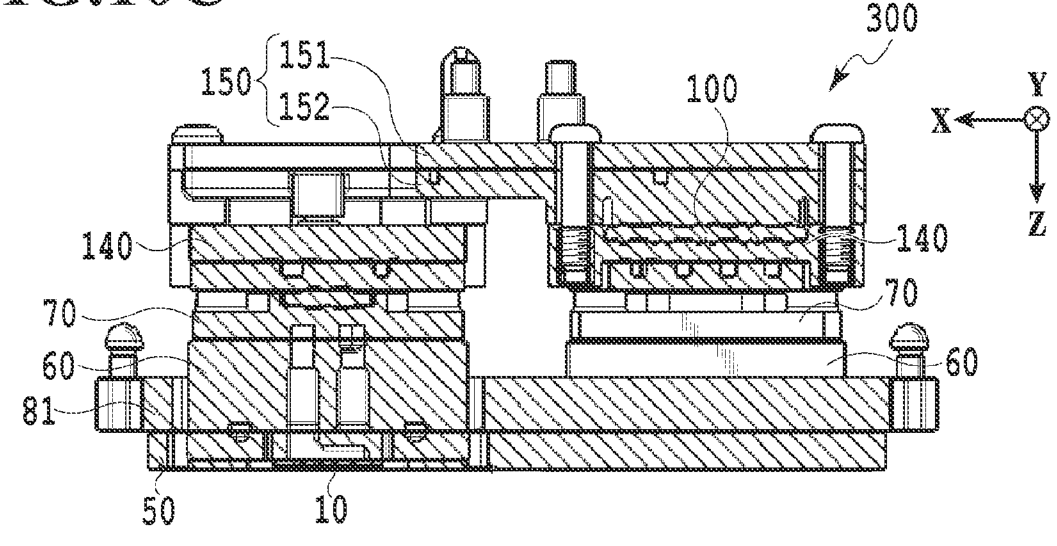
FIG. 10C is a view illustrating a state where the second flow passage unit is attached in the state of FIG. 9A.

FIGS. 10A to 10C are views illustrating an ejection unit 300 in which a second flow passage unit 150 is attached in the state of FIG. 9A. FIG. 10A is an exterior perspective view, FIG. 10B is a top view, and FIG. 10C is a cross-sectional view along the line XC-XC in FIG. 10B. The ejection unit 300 includes the second flow passage unit 150, the first flow passage units 140, and the ejection modules 200. A sixth flow passage member 151 and a seventh flow passage member 152 (see FIG. 10C) are joined to each other by adhesive, and form the second flow passage unit 150. Moreover, the joint rubbers 100 are sandwiched between the second flow passage unit 150 and the two first flow passage units 140 arranged in parallel in a Y direction, and the second flow passage unit 150 is compressed in the Z direction by screw fastening to achieve flow passage connection.

Such a configuration allows the liquid flow passages of the four ejection modules 200 bonded to the support member 81 to be connected to the flow passages of the two first flow passage units 140, and allows the flow passages of the two first flow passage units 140 to be connected to the flow passages of the one second flow passage unit 150. As a result, it is possible to integrate the liquid flow passages of the four ejection modules 200 into the flow passages of the second flow passage unit 150, and facilitate the connection to the liquid supply unit 220 (see FIG. 4).

There is a risk that the support member 81 thermally deforms and positions of the ejection modules 200 relative to one another in the Y direction or the X direction change, depending on the temperature of the liquid to be used. Moreover, there is a risk that use of a high-temperature liquid causes the ejection modules 200, the first flow passage units 140, and the second flow passage unit 150 to be affected by linear expansion, and the positions thereof relative to one another change in the Y direction or the X direction. Such misalignment of parts relative to one another may cause liquid leakage at flow passage connection units.

Accordingly, in the present embodiment, the liquid ejection apparatus 101 is configured such that the joint rubbers 100 that are the elastic members are sandwiched between the members of the first flow passage units 140 and the second flow passage unit 150, and the second flow passage unit 150 is compressed in the Z direction by screw fastening. This configuration allows the joint rubbers 100 to absorb the effect of the misalignment of the parts relative to one another in the Y direction and the X direction. As a result, liquid leakage in the flow passage connection units due to the effect of the linear expansion in the Y direction or the X direction can be suppressed.

Figure 11A:
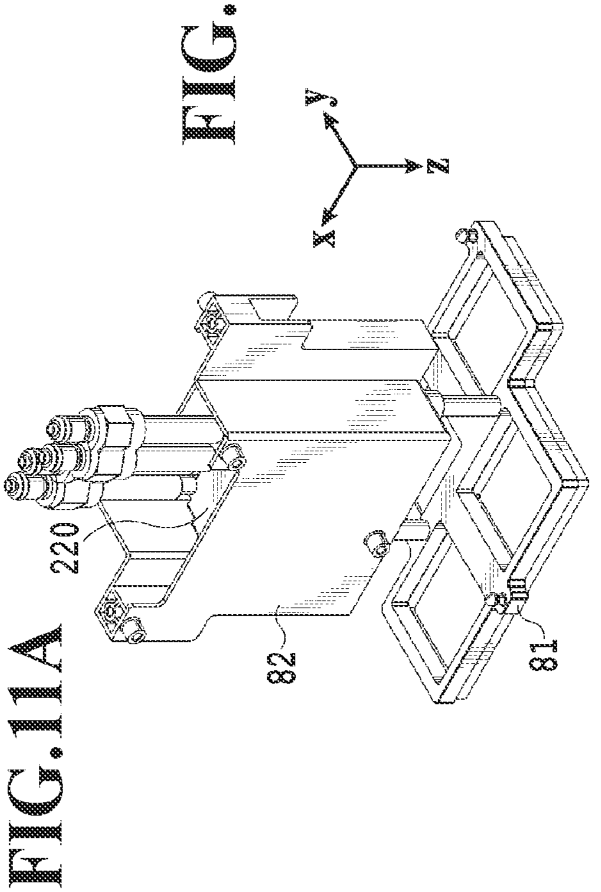
FIG. 11A is a view illustrating a liquid supply unit and an electric wiring board support member.
Figure 11B:
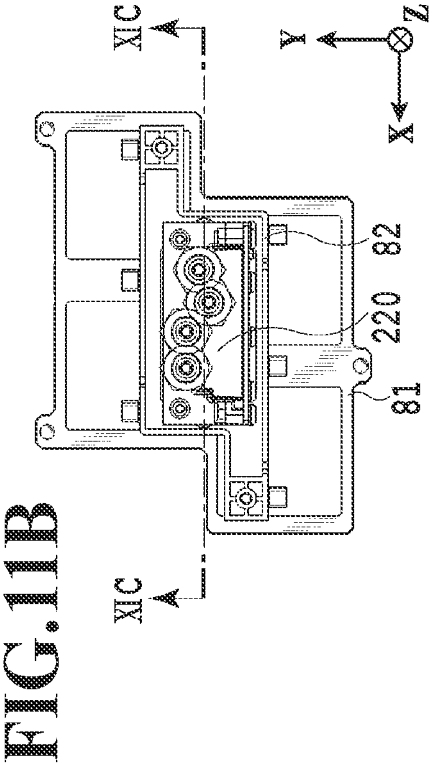
FIG. 11B is a view illustrating the liquid supply unit and the electric wiring board support member.
Figure 11C:
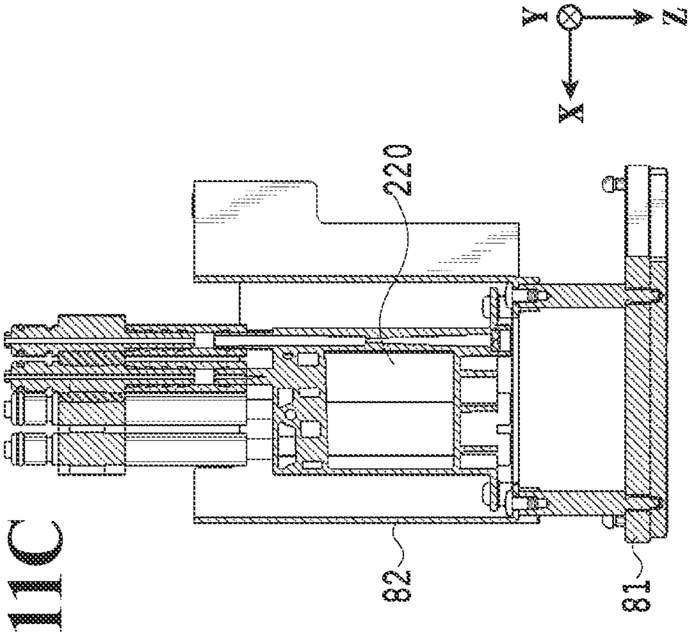
FIG. 11C is a view illustrating the liquid supply unit and the electric wiring board support member.

FIGS. 11A to 11C are views illustrating the liquid supply unit 220 and the electric wiring board support member 82 attached to the support member 81. Note that, in FIGS. 11A to 11C, illustration of the ejection modules 200 is omitted. FIG. 11A is a schematic perspective view, FIG. 11B is a top view, and FIG. 11C is a cross-sectional view along the line XIC-XIC in FIG. 11B.

The liquid supply unit 220 is attached to the electric wiring board support member 82, and the electric wiring board support member 82 is attached to the support member 81. The liquid supply unit 220 is thereby in a state aligned with respect to the support member 81.

Figure 12B:
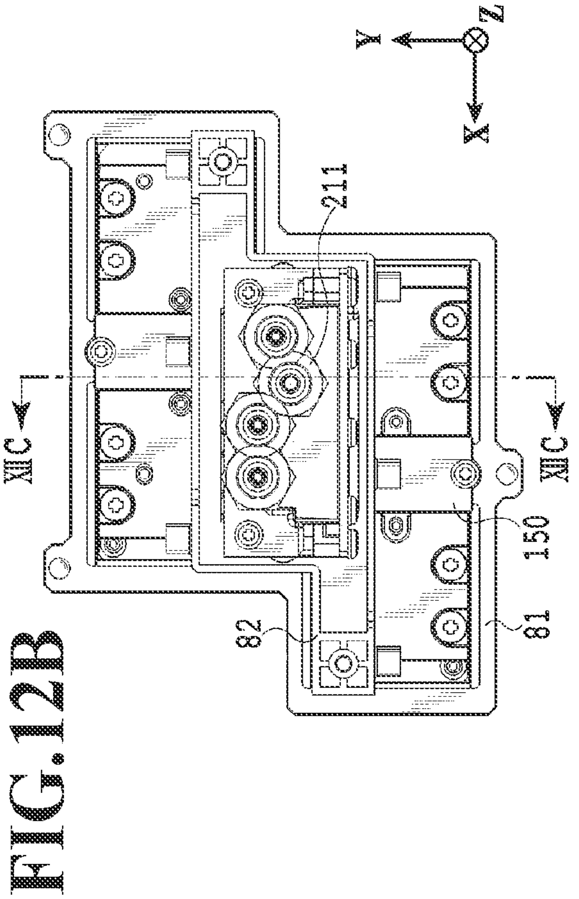
FIG. 12B is a view illustrating the liquid supply unit connected to the ejection unit.
Figure 12C:
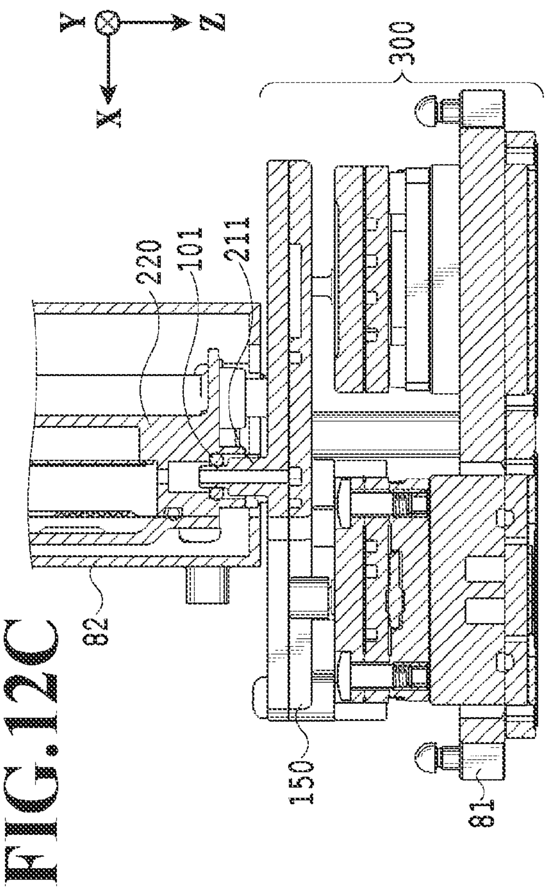
FIG. 12C is a view illustrating the liquid supply unit connected to the ejection unit.
Figure 12A:
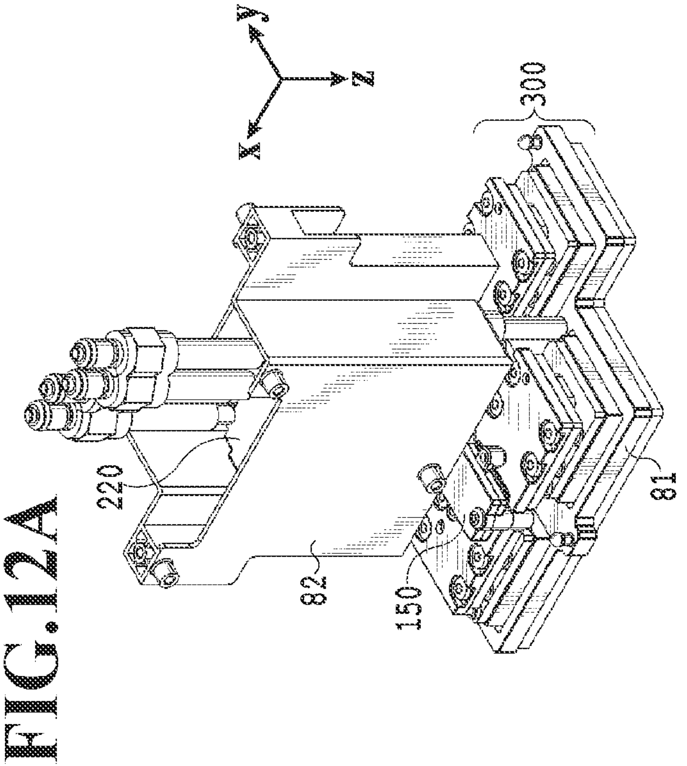
FIG. 12A is a view illustrating the liquid supply unit connected to an ejection unit.

FIGS. 12A to 12C are views illustrating the liquid supply unit 220 connected to the ejection unit 300. FIG. 12A is a schematic perspective view, FIG. 12B is a top view, and FIG. 12C is a cross-sectional view along the line XIIC-XIIC in FIG. 12B.

The ejection unit 300 is connected to the liquid supply unit 220 via the liquid connection units 211 in the second flow passage unit 150, and the liquid is supplied to the ejection unit 300. Flow passage connection of the liquid connection units 211 in the second flow passage unit 150 is achieved such that sealing members 101 are inserted into the liquid supply unit 220 while being compressed in a radial direction of the liquid connection units 211.

In the connection of the ejection unit 300 and the liquid supply unit 220, the liquid connection units 211 are inserted into recess portions of the liquid supply unit 220 while the liquid supply unit 220 is moved in the Z direction. In this case, if a movement amount of the liquid supply unit 220 exceeds a desired amount, excessive force in the Z direction is applied to the second flow passage unit 150. Since the ejection modules 200 are bonded to the surface of the support member 81 on the ejection direction side (Z direction side), if the force in the Z direction applied to the second flow passage unit 150 is transmitted to the ejection modules 200, this force may cause the ejection modules 200 to be separated from the support member 81.

Accordingly, in the present embodiment, the liquid supply unit 220 is aligned with respect to the support member 81 by the electric wiring board support member 82. Thus, the movement amount of the liquid supply unit 220 does not exceed the desired amount in the connection, and it is possible to suppress application of excessive force to the liquid connection units 211 and suppress separation in the bonding portions between the ejection modules 200 and the support member 81.

Although the configuration in which the liquid supply unit 220 is attached to the electric wiring board support member 82 and the electric wiring board support member 82 is attached to the support member 81 is described in the present embodiment, the configuration is not limited to this. It is only necessary that the liquid supply unit 220 is aligned with respect to the support member 81. For example, the liquid supply unit 220 may be directly attached to the support member 81.

Moreover, in the case where a high-temperature liquid flows, there is a possibility that the members of the liquid ejection head 3 linearly expand in the Z direction. Then, there is a risk that deformation due to the linear expansion of the members causes force to be applied to the bonding portions of the ejection modules 200 and the support member 81, and causes separation in the bonding portions.

Accordingly, in the present embodiment, the flow passage connection of the liquid connection units 211 is achieved such that the sealing members 101 are inserted into the liquid supply unit 220 while being compressed in the radial direction of the liquid connection units 211. The liquid connection units 211 are thus configured to be movable in the Z direction relative to the liquid supply unit 220 also in the connected state. Accordingly, the effect of the linear expansion in the Z direction in the members of the liquid ejection head 3 can be absorbed in the connection units in which the liquid connection units 211 are inserted. This can suppress application of force to the bonding portions of the ejection modules 200 and the support member 81, and suppress separation in the bonding portions.

As described above, the liquid supply unit 220 is aligned with respect to the support member 81 to which the ejection modules 200 are bonded. Moreover, the liquid connection units 211 of the ejection unit 300 are movably connected to the liquid supply unit 220 in the connection unit between the ejection unit 300 and the liquid supply unit 220. This can provide a liquid ejection head and a liquid ejection apparatus in which separation of the ejection modules 200 from the support member 81 is suppressed.

Second Embodiment

A second embodiment of the present embodiment is described below with reference to the drawings. Since a basic configuration of the present embodiment is the same as that of the first embodiment, characteristic configurations are described below.

Figure 13B:
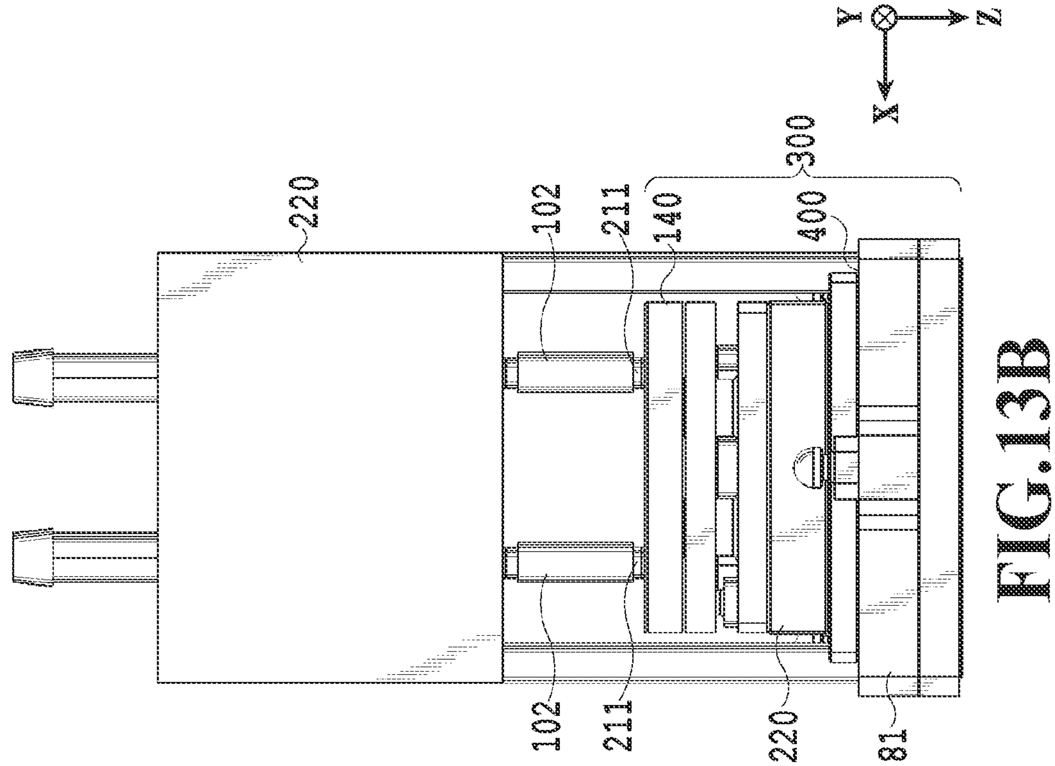
FIG. 13B is a view illustrating the ejection unit and the liquid supply unit.
Figure 13A:
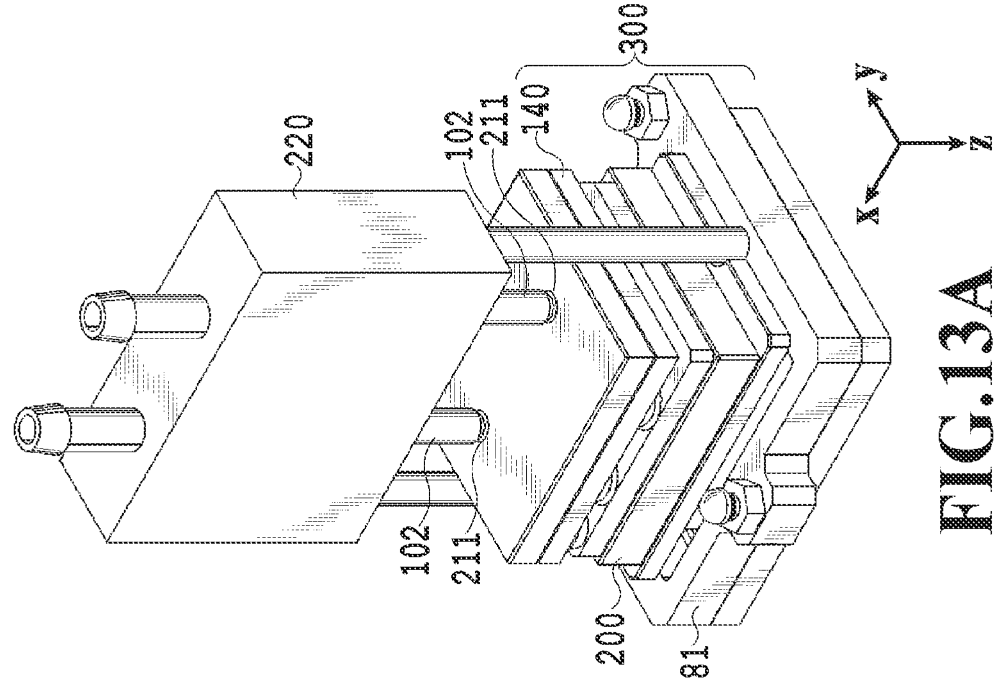
FIG. 13A is a view illustrating the ejection unit and the liquid supply unit.

FIGS. 13A and 13B are views illustrating the ejection unit 300 and the liquid supply unit 220 in the present embodiment. Unlike in the first embodiment, in the present embodiment, one ejection module 200 is attached to the support member 81, and the ejection module 200 is attached to a fixation surface 400 that is a surface of the support member 81 and to which the liquid supply unit 220 is fixed. Moreover, the liquid connection units 211 and the liquid supply unit 220 achieve flow passage connection by using tubes 102.

Attaching the ejection module 200 to the fixation surface 400 prevents force from acting in a direction in which the ejection module 200 is separated from the support member 81, in the connection of the liquid supply unit 220 and the tubes 102. Accordingly, it is possible to suppress separation of the ejection module 200 from the support member 81. Moreover, the tubes 102 can absorb the effect of the linear expansion in the Z direction in the members of the liquid ejection head 3 by deforming. As a result, it is possible to suppress application of force to the bonding portion of the ejection module 200 and the support member 81 and suppress separation in the bonding portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-056229, filed Mar. 30, 2022, which is hereby incorporated by reference herein in its entirety.

What is claimed is:

1. A liquid ejection head comprising:

an ejection module configured to eject a liquid in an ejection direction;

a support member configured to support the ejection module; and a liquid supply unit connected to the ejection module by a connection flow passage and configured to supply the liquid to the ejection module, wherein the support member supports the ejection module such that the ejection module is bonded to a surface of the support member on the ejection direction side, the liquid supply unit is aligned with respect to the support member, and the connection flow passage is provided to be movable relative to the liquid supply unit in a state where the ejection module and the liquid supply unit are connected to each other by the connection flow passage.

2. The liquid ejection head according to claim 1, wherein the support member supports at least two ejection modules.

3. The liquid ejection head according to claim 1, wherein the connection flow passage is connected to the liquid supply unit such that a portion of the connection flow passage is inserted into a recess portion provided in the liquid supply unit.

4. The liquid ejection head according to claim 3, wherein the connection flow passage and the liquid supply unit are connected to each other via a sealing member, and the sealing member is compressed between the connection flow passage and the recess portion in a radial direction with respect to an axis extending in the ejection direction.

5. The liquid ejection head according to claim 1, wherein the connection flow passage includes a first flow passage member and a second flow passage member, and an elastic member is provided between the first flow passage member and the second flow passage member.

6. The liquid ejection head according to claim 1, wherein the ejection module includes an element board including an element configured to generate ejection energy used in ejection of the liquid, and the connection flow passage includes a first flow passage through which the liquid to be ejected flows and a second flow passage through which a coolant flows.

7. The liquid ejection head according to claim 1, wherein the liquid supply unit is aligned with respect to the support member via an electric wiring board support member.

8. The liquid ejection head according to claim 1, wherein the connection flow passage and the liquid supply unit are connected to each other via a tube.

9. A liquid ejection apparatus configured such that a liquid ejection head is mountable, the liquid ejection head including an ejection module configured to eject a liquid in an ejection direction, a support member configured to support the ejection module, and a liquid supply unit connected to the ejection module by a connection flow passage and configured to supply the liquid to the ejection module, wherein the support member supports the ejection module such that the ejection module is bonded to a surface of the support member on the ejection direction side, the liquid supply unit is aligned with respect to the support member, and the connection flow passage is provided to be movable relative to the liquid supply unit in a state where the ejection module and the liquid supply unit are connected to each other by the connection flow passage.

* * * * *